United States Patent [19]

Nakao et al.

[11] Patent Number: 5,043,960
[45] Date of Patent: Aug. 27, 1991

[54] OVERWRITABLE MAGNETO-OPTIC RECORDING AND REPRODUCING APPARATUS

[75] Inventors: Takeshi Nakao, Sagamihara; Masahiro Ojima, Tokyo, both of Japan

[73] Assignee: Hitachi, Ltd., Tokyo, Japan

[21] Appl. No.: 248,376

[22] Filed: Sep. 23, 1988

[30] Foreign Application Priority Data

Sep. 25, 1987 [JP] Japan ................................ 62-238721

[51] Int. Cl.⁵ ...................... G11B 13/04; G11B 11/12
[52] U.S. Cl. ........................................ 369/13; 369/54; 369/58; 360/59; 360/114
[58] Field of Search ....................... 369/13, 45, 46, 54, 369/58, 116, 110, 109, 120, 121, 124; 360/59, 114; 365/125; 250/201 DF

[56] References Cited

U.S. PATENT DOCUMENTS

| | | | |
|---|---|---|---|
| 3,521,294 | 7/1970 | Treves | 360/59 |
| 4,340,914 | 7/1982 | Hanaoka | 360/59 |
| 4,547,872 | 10/1985 | Henmi et al. | 369/54 |
| 4,558,440 | 12/1985 | Tomita | 369/13 |
| 4,562,568 | 12/1985 | Hazel et al. | 369/110 |
| 4,573,149 | 2/1986 | Deguchi et al. | 369/13 |
| 4,730,289 | 3/1988 | Saitoh et al. | 369/13 |
| 4,805,043 | 2/1989 | Doyle | 360/59 |

FOREIGN PATENT DOCUMENTS

| | | |
|---|---|---|
| 51-107121 | 9/1976 | Japan . |
| 59-215008 | 12/1984 | Japan . |
| 60-48806 | 10/1985 | Japan . |
| 61-190743 | 8/1986 | Japan ................................ 369/13 |

OTHER PUBLICATIONS

Hartmann et al, "Erasable Magneto-Optical Recording Media", IEEE Transactions on Magnetics, vol. MAG 20, No. 5, p. 1013, 1984.

Primary Examiner—Stuart S. Levy
Assistant Examiner—Hoa Nguyen
Attorney, Agent, or Firm—Antonelli, Terry, Stout & Kraus

[57] ABSTRACT

According to the present invention, the apparatus is provided with a single laser light source and arranged so that light from the laser light source is divided into a plurality of beams by a grating and the plurality of beams are converged to form a plurality of light spots on a recording film by an optical system, whereby in writing information onto a recording film, overwriting to perform erasing and writing at the same time is carried out and an error check on the recorded information is performed in real time while a magnetic field which is polarity-inverted or intensity-modulated in accordance with the recording information is applied to the recording film.

19 Claims, 6 Drawing Sheets

- $(a_1) - (a_2) \longrightarrow$ MAGNETO-OPTIC SIGNAL (WRITE) ---- $SP_1$
- $(b_1 + c_1 + d_1 + e_1) - (b_2 + c_2 + d_2 + e_2) \longrightarrow$ MAGNETO-OPTIC (READ)
- $(b_1 + e_1) - (b_2 + e_2) \longrightarrow$ FOCUSING ERROR SIGNAL ---- $SP_2$
- $(c_1 - d_1) + (c_2 + d_2) \longrightarrow$ TRACKING ERROR SIGNAL ---- $SP_2$
- $(f_1) - (f_2) \longrightarrow$ READ SIGNAL ---- $SP_1$

OVERWRITABLE MAGNETO-OPTIC RECORDING AND REPRODUCING APPARATUS

BACKGROUND OF THE INVENTION

The present invention relates to a magneto-optic recording apparatus such as a magneto-optic disk apparatus using a magneto-optic recording medium, for example, a magneto-optic disk, and particularly relates to an overwritable magneto-optic recording apparatus which can perform overwriting and an error check at the same time by using a laser light source. The "overwriting" is a function for rewriting previously written recorded information into new one by overwriting, and "error check" is a function for reading the overwritten recorded information and confirming it.

Conventionally, examples of an overwritable magneto-optic recording apparatus include that of a system using two lightspots as described in IEEE Transactions on Magnetics, Vol. MAG-20, No. 5, p. 1013, 1984, and that of a magnetic field modulation method in which while a recording film is irradiated with a light beam with a constant intensity, a magnetic field modulated in accordance with recording information is applied to an area irradiated with the light beam, as described in Japanese Patent Unexamined Publications No. 51-107121 and No. 59-215008, and Japanese Patent Post-Examination Publication No. 60-48806. The present invention particularly relates to a magneto-optic recording apparatus according to that of the latter, magnetic field modulation method.

In order to improve the data processing speed in a magneto-optic recording apparatus, a function for performing an error check within a one disk rotation in addition to an overwriting function is desirable. In a conventional overwritable magneto-optic recording apparatus, however, no consideration has been given on such an error check function.

SUMMARY OF THE INVENTION

It is an object of the present invention to provide a magneto-optic recording apparatus in which overwriting and DRAW (direct read after write) can be carried out at the same time by use of a single laser light source so that the apparatus is high in processing speed and compact in size.

A system in which, in order to realize a DRAW function for performing an error check immediately after writing, two semiconductor lasers are provided in a recording optical head system so as to arrange two light spots on one and the same track so that one of the two light spots is used as a writing spot and the other is used as a reading spot has been proposed in U.S. patent application Ser. No. 153,094 (filed Feb. 8, 1988), now U.S. Pat. No. 4,969,137, U.S. patent application Ser. No. 173,658 (filed Mar. 25, 1988), now U.S. Pat. No. 4,901,325, and Japanese Patent Application No. 62-153478 (corresponding to U.S. patent application Ser. No. 209,982, filed June 22, 1988). Those proposals require two or more laser light sources.

On the other hand, if two light spots are formed by using a single laser light source and writing is effected while the intensity of the laser light is modulated in accordance with the recording information, the intensity of a reading spot for an error check is also modulated during writing. Accordingly, it has been considered difficult to perform overwriting and DRAW at the same time by use of a single laser light source.

According to the present invention, the apparatus is provided with a single laser light source and arranged so that light from the laser light source is divided into a plurality of beams by a grating and the plurality of beams are converged to form a plurality of light spots on a recording film by optics, whereby in writing information onto a recording film, overwriting to perform erasing and writing at the same time is carried out and an error check on the recorded information is performed in real time while a magnetic field which is polarity-inverted or intensity-modulated in accordance with the recording information is applied to the recording film. That is, a single laser light source constituted by for example, a single semiconductor laser is used, and a laser beam from the single laser light source is divided by a diffraction grating into a plurality of laser beams, for example, three laser beams, for example, 0-order laser light and ± first-order laser light so that a magneto-optic recording film formed on a transparent substrate is irradiated with the laser beams through optics constituted by an objective and so on, and through the transparent substrate. Those laser beams are arranged so that one and the same track is irradiated with those laser beams, for example, in a manner so that the track is irradiated with a third light spot made by the −first-order light first, then irradiated with a second light spot made by the 0-order light, and next irradiated with a first light spot made by the +first-order light. The second light spot made by the 0-order light is the highest in intensity and the second light spot is used as a writing/erasing spot in writing while used as a reading spot in reading. The second light spot is used also for detection of a focusing error signal and a tracking error signal. The first and third light spots are lower in intensity than the second light spot. IN writing, reading of an address is performed by the third light spot preceding the second light spot, and confirmation of writing, that is, the error check, is performed by the first light spot succeeding the second light spot. According to the present invention, therefore, there are provided a magneto-optic signal detecting circuit, an address information detecting circuit, a focusing error signal detecting circuit, and a tracking error signal detecting circuit. In each of the focusing error signal detecting circuit and the tracking error signal detecting circuit, a signal obtained by the second light spot is used both in writing and in reading, however, in each of the magneto-optic signal detecting circuit and the address information detecting circuit, the light spots to be used are different in the writing mode and in the reading mode, and therefore the light spot is switched between the writing and the reading, for example, in a manner so that the magneto-optic signal detecting circuit is connected to a signal obtained by the first light spot to thereby perform the error check in the writing mode while connected to a signal obtained by the second light spot to thereby perform reading of a magneto-optic signal in the reading mode. The address information detecting circuit is connected to a signal obtained by the third light spot in the writing mode while connected to a signal obtained by the second light spot in the reading mode, to thereby perform address reading. The write/read switching in such a detecting circuit is performed by a control signal from a controller. A magnetic head for applying a magnetic field with a polarity in accordance with recording information to at least a portion irradiated with the second light spot is provided so that a magneto-optic recording carrier is located between the magnetic head and the irradiated portion. In the writing, the magnetic head applies a magnetic field with a polarity in accordance with information to be recorded on a magneto-optic recording film while the magneto-optic recording film is locally heated by the second light spot of the high intensity to thereby carry out overwriting so that new information is written while old information having been recorded is erased. According to the present invention, even in writing, it is not necessary to modulate laser light in accordance with recording information, and therefore the intensity of light of a reading spot for the error check is constant, so that it is possible to perform the error check as well as overwriting stably at the same time.

To make it possible to carry out erasing, writing, and error check of information in real time by means of a single laser light source in a magneto-optic recording apparatus is a new effect which can be realized only by use of a technique of division of luminous flux by a grating as well as a magnetic field modulation recording system.

Since a single laser light source is used, it is possible to realize a small-sized and inexpensive apparatus. Further, since only rotation adjustment of a diffraction grating is required to arrange a plurality of light spots on one and the same information track, there is another effect to make the apparatus extremely easy in adjustment thereof.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENT

Figure 1:
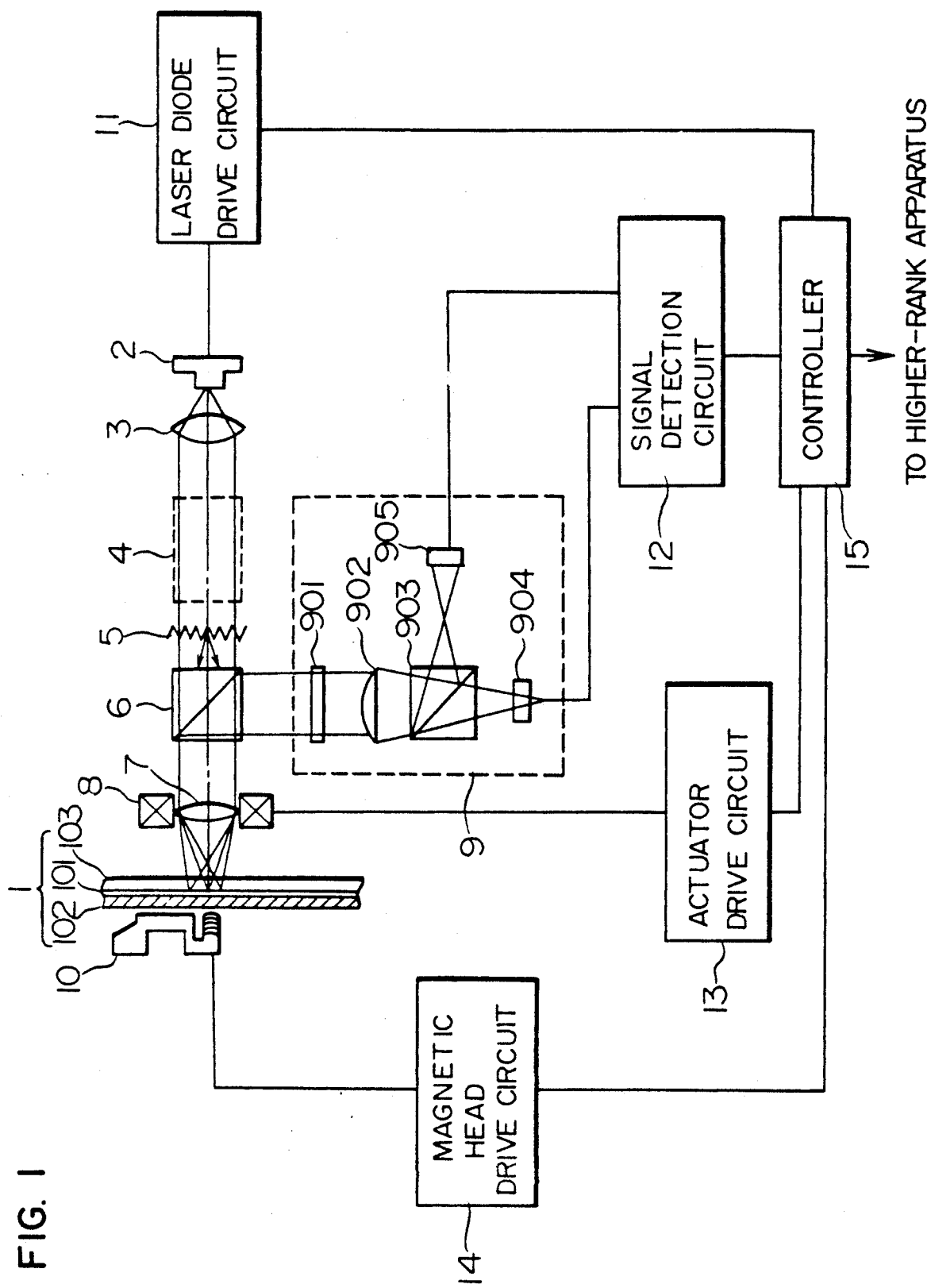
FIG. 1 is a diagram illustrating an embodiment of the present invention.

FIG. 1 is a schematic constituent diagram of a magneto-optic disk apparatus as an embodiment of the present invention.

In FIG. 1, a magneto-optic disk 1, which is a rotary recording carrier, is provided with a magneto-optic recording medium 101 having a magneto-optic effect and provided on a disk-shaped transparent substrate 103 and a protective coating 102 formed on the magneto-optic recording medium 101. For example, light emitted from a light source constituted by a semiconductor laser 2 is converted into parallel luminous flux by a collimating lens 3, and further converted into a beam having a circular intensity distribution by beam shaping optics 4. Next, the beam is separated into a plurality of beams (three beams, 0-order and ± first-order beams in this embodiment) by a diffraction grating 5, and the beams are made to be incident to a convergent lens 7 through a beam splitter 6. A light beam converged by the convergent lens 7 is incident to the disk 1 from the transparent substrate 103 side and forms a very small spot of about 1 $\mu$m in diameter on the recording film 101. The convergent lens 7 is attached to an actuator 8 so as to follow the runout of the disk 1 to make the focal point thereof come always on the recording film, and so as to follow the eccentricity of an information recording track on the disk 1 to make a spot come always on a desired track. The light reflected from the disk 1 and passed through the convergen lens 7 is then reflected again by the beam splitter 6 so as to be led to signal detecting optics 9 for detecting a light spot control signal of tracking error and so on.

A magnetic head 10 is provided so that the magneto-optic disk 1 is between the magnetic head 10 and the convergent lens 7 and the magnetic head 10 applies a magnetic field to a portion of the magneto-optic disk 1 irradiated with a light spot. The magnetic head 10 is a floating type magnetic head which is floated by air pressure generated between a magneto-optic disk 1 and the magnetic head 10 by the rotation of the magneto-optic disk 1. Since the floating quantity of the floating type magnetic head 10 is substantially constant, the magnetic head 10 follows the runout of the magneto-optic disk 1 so that the distance between the magnetic head 10 and the magneto-optic disk 1 is kept substantially constant during operation thereof. The magnetic head 10 is arranged so as to be movable in the radial direction of the disk 1, by, for example, a linear motor, a step motor or the like, together with an optical head constituted by the above-mentioned laser light source, a laser radiation optics and a signal detection optics. A magneto-optic recording apparatus using such a floating type magnetic head has been proposed in the above-mentioned U.S. patent application Ser. No. 153,094.

Figure 2:
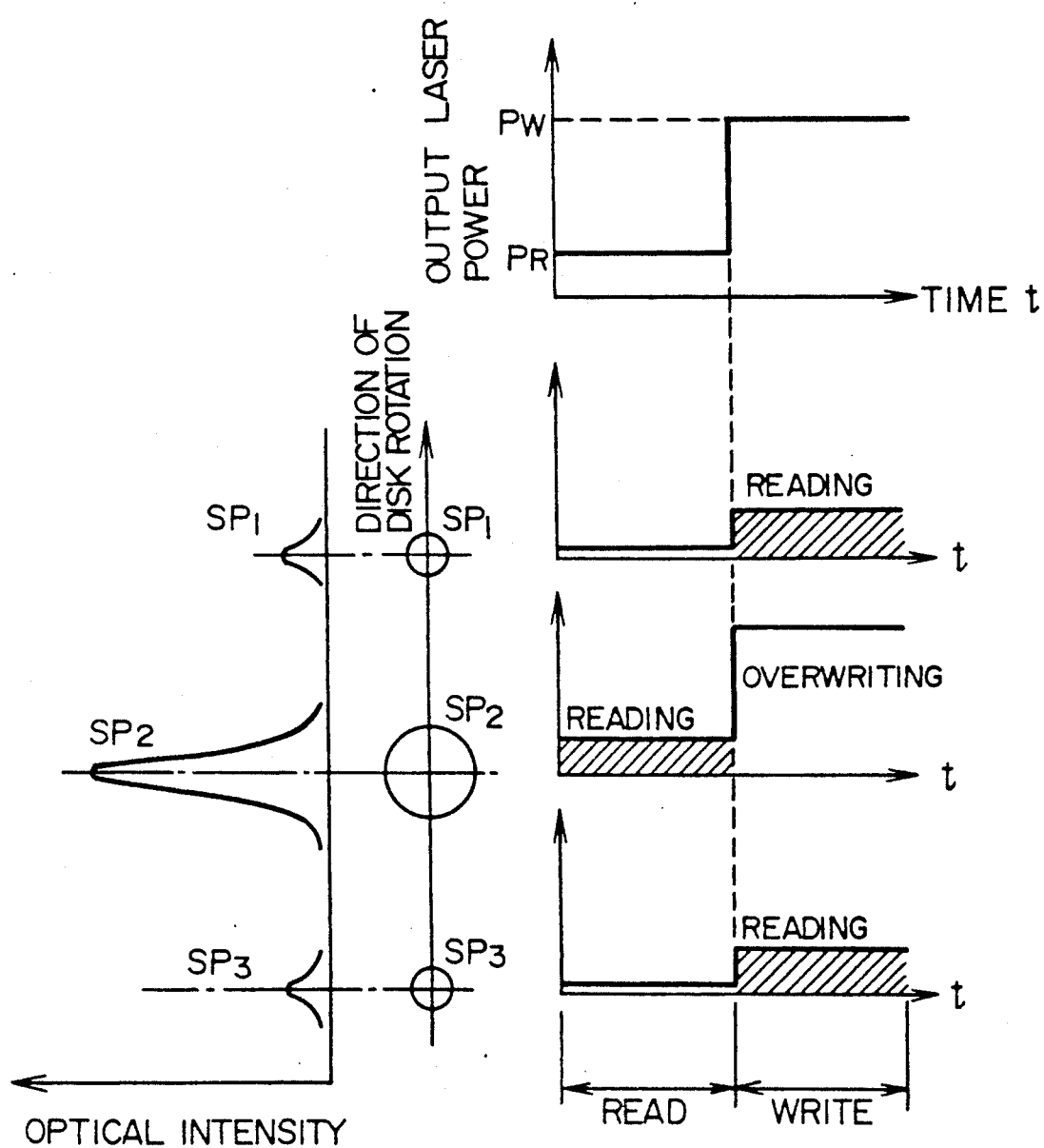
FIG. 2 is a diagram illustrating intensity distributions of respective light spots.

FIG. 2 shows light spots on a recording film and the intensity distributions of the respective light spots in writing/reading. Description will be made here about the case where three light spots are formed by the diffraction grating 5. A light spot $SP_2$ at the center is that made by 0-order diffraction light, and light spots $SP_3$ and $SP_1$ preceding and succeeding the light spot $SP_2$ respectively are those made first-order diffraction light. Assuming that the direction of rotation of the disk is taken as shown in FIG. 2, the light spots $SP_3$, $SP_2$ and $SP_1$ pass a certain point on the disk in order. It is therefore possible to assign a preceding reading spot, a writing/erasing spot and a reading spot for the error check to the spots $SP_3$, $SP_2$ and $SP_1$ respectively. The ratio of light intensity among the respective light spots is set in a manner so that the reading spots $SP_1$ and $SP_3$ have a reading power and the writing/erasing spot $SP_2$ has a writing power. This can be determined arbitrarily by changing the arrangement of the diffraction grating 5. For example, in the case where the reading power and the writing power are selected to be 1 mW and 7 mW respectively, it will do to establish the optical intensity ratio of each of the spots $SP_1$ and $SP_3$ to the spot $SP_2$ to be 1:7.

The luminous power of the laser light source in reading and in writing is also shown in FIG. 2. The laser is made to emit light with low power $P_r$ during reading. At that time, the spot $SP_2$ has the reading power so as to perform (a) reading of a magneto-optic signal, (b) reading of a pit information signal in the case of a magneto-optic disk in which address information and so on have been formed in the form of pits, (c) detection of a focusing error signal, and (d) detection of a tracking error signal. The spots $SP_1$ and $SP_3$ are not used since their power is low.

During writing, on the other hand, the laser 2 is made to emit light with high power $P_W$. At that time, the spot $SP_2$ operates as a light spot for writing/ erasing, that is, for overwriting. Switching of power of the semiconductor laser 2 between reading and writing is performed by a laser diode drive circuit 11 which is controlled by a controller 15. If the recording film 101 is irradiated with the laser light spot $SP_2$ of high power, the temperature of the recording film 101 rises at the portion irradiated with the light spot $SP_2$ so that the magnetizing force as well as coercive force of the recording film are decreased. At this time, if the magnetic head 10 is driven by a magnetic head drive circuit 14 so that a magnetic field with a polarity in accordance with recording information is applied to the recording film 101 from the magnetic head 10, the magnetization of the recording film 101 is fixed in the direction of the applied magnetic field in the process of cooling of the recording film 101. Since the old information which has been recorded is erased at the time when the temperature of the recording film 101 has risen, it is possible to carry out overwriting in which erasure of old information and writing of new information are performed simultaneously. For writing, the spot $SP_2$ also acts for detection of a focusing error signal and a tracking error signal. On the other hand, since the spots $SP_1$ and $SP_3$ have the reading power, the spot $SP_3$ precedes the $SP_2$ and acts for reading of address information and so on, and the spot $SP_1$ acts for reading of a magneto-optic signal to thereby perform the error check immediately after writing.

Figure 3A:
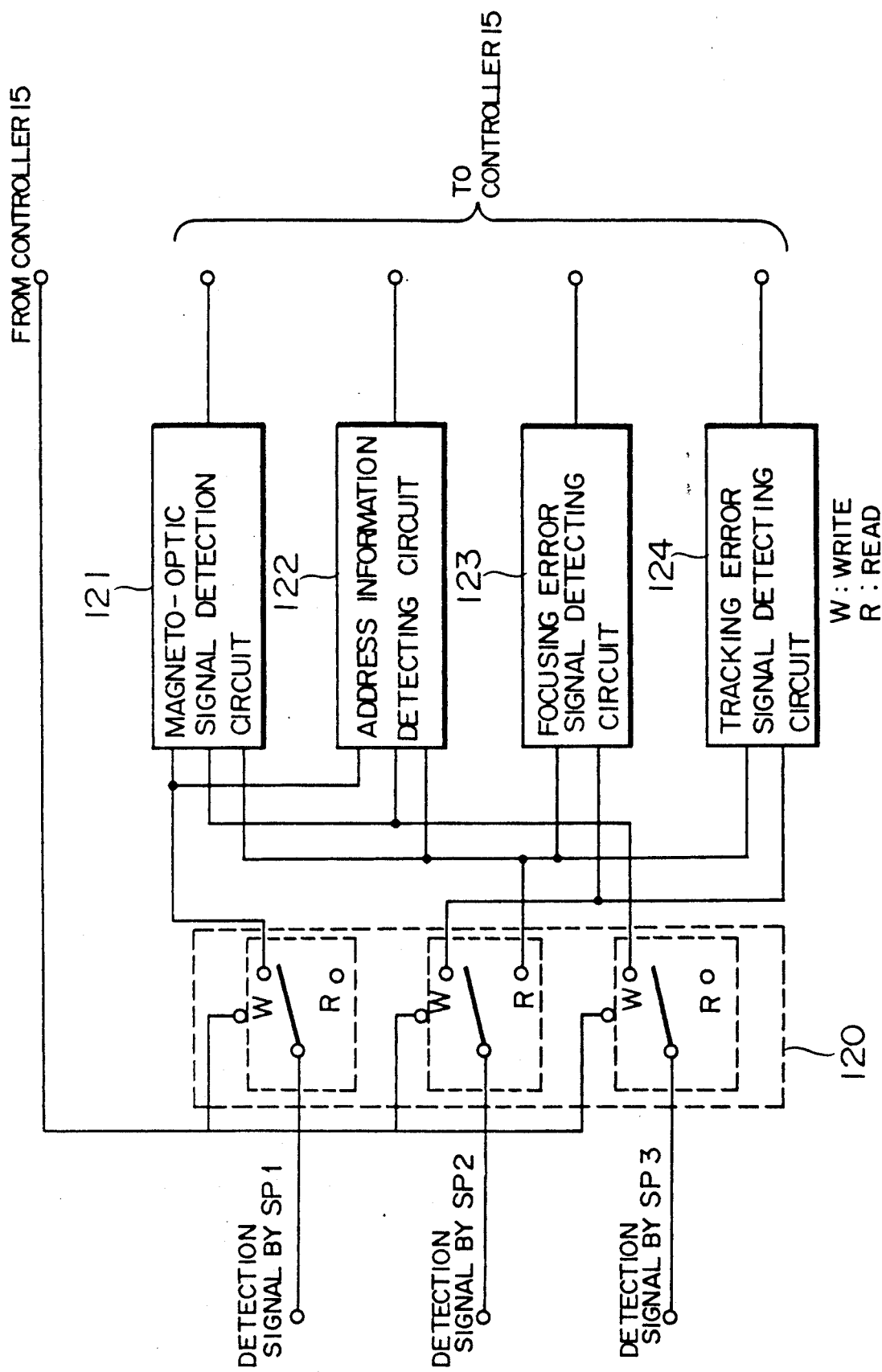
FIGS. 3A and 3B are diagrams illustrating switching circuits for detection signals.

According to the present invention, a magneto-optic signal reading system is switched over between writing and reading. FIG. 3A shows a circuit for performing the switching. The circuit of FIG. 3A is provided in a signal detecting circuit 12 of FIG. 1. Switching of each signal detecting circuit is performed by a changeover switch 120. The switching is performed during writing and reading, and a signal from the controller 15 is used for its timing. The preceding spot $SP_3$ is required if address information and so on are recorded in the form of a magneto-optic signal and the information has to be read during writing.

Figure 3B:
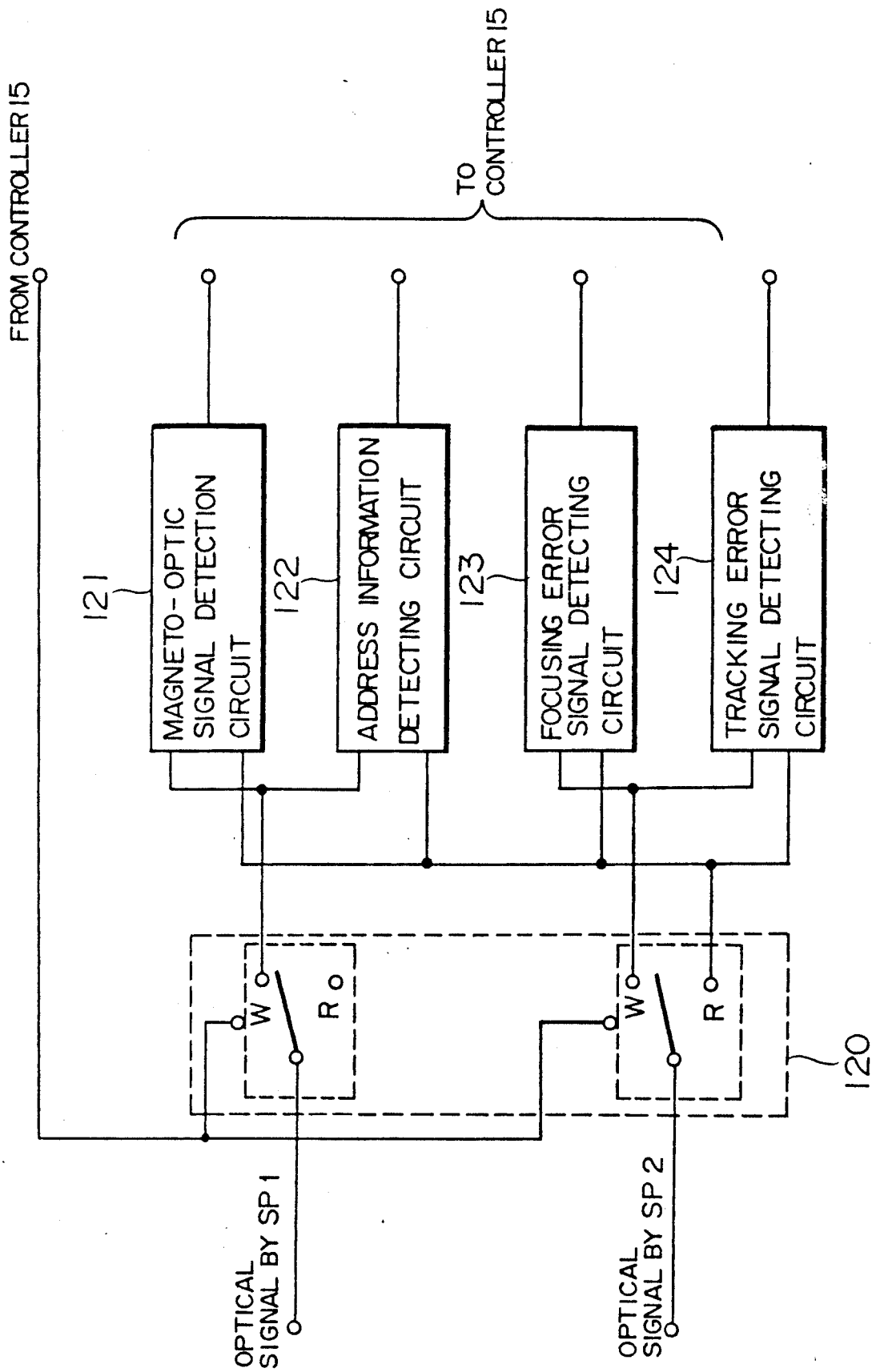
Figure 4:
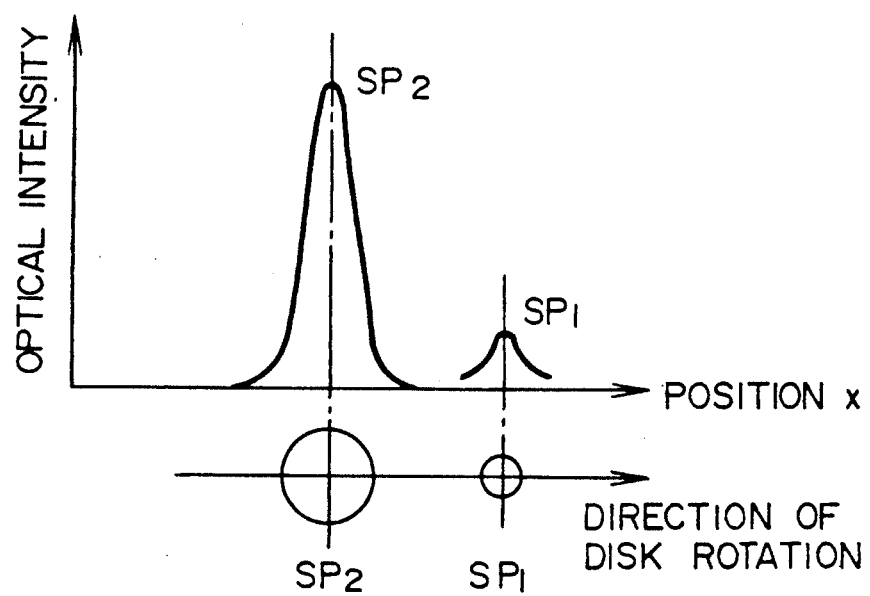
FIG. 4 is a diagram illustrating a modification according to the present invention.

In the case of a magneto-optic disk in which address information and so on are formed in the form of pits, signals of the disk may be read by the spot $SP_2$. In the case where it is not necessary to precedingly read address information and so on, the spot SP may be eliminated. In this case, a diffraction grating is set up so that the intensity distributions of respective light spots are established as shown in FIG. 4, and the switching circuit may be arranged, for example, as shown in FIG. 3B.

Although switching of a magneto-optic signal detecting circuit for writing/erasing has been described, a light spot for detecting a focusing error signal and a tracking error signal may be switched over between in writing and reading. Table 1 shows examples of switching of light spots for detecting a focusing error signal and a tracking error signal The switching circuits of FIGS. 3A and 3B apply to the cases of those examples, and therefore description thereof is omitted.

TABLE 1

| Examples of Switching of Light Spot Control Signals | | | | | |
|---|---|---|---|---|---|
| In writing | | | In reading | | |
| $SP_1$ | $SP_2$ | $SP_3$ | $SP_1$ | $SP_2$ | $SP_3$ |
| 1 |  | AF, TR |  |  | AF, TR |  |
| 2 |  | AF | TR |  | AF, TR |  |
| 3 |  | TR | AF |  | AF, TR |  |
| 4 | TR |  | AF |  | AF, TR |  |
| 5 | AF |  | TR |  | AF, TR |  |
| 6 | TR | AF |  |  | AF, TR |  |
| 7 | AF | TR |  |  | AF, TR |  |

Figure 5:
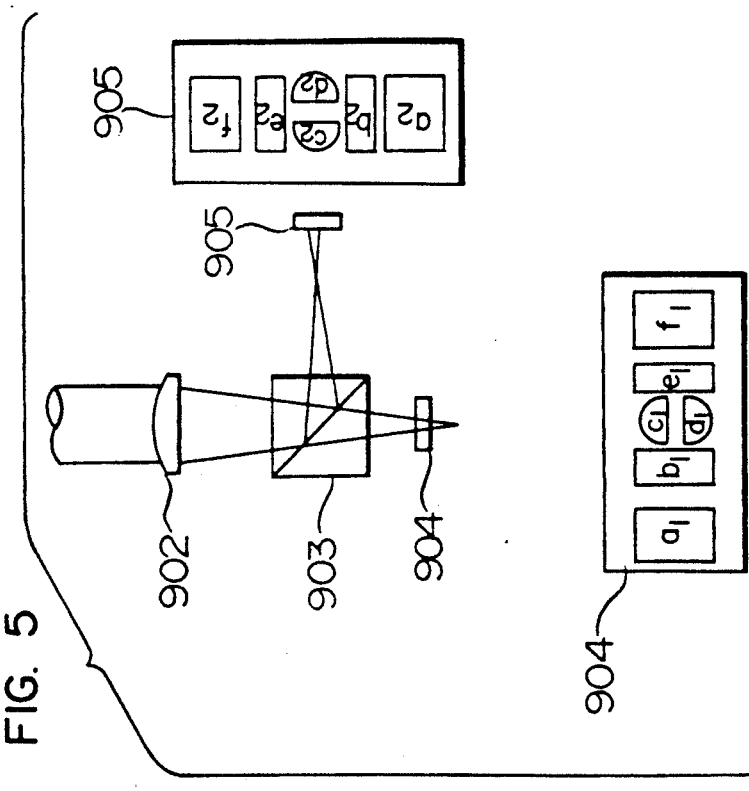
FIG. 5 is a diagram illustrating a signal detection optics and signal processing thereby in an embodiment of the present invention.

AF . . . focusing error signal detection
TR . . . tracking error signal detection Next, the signal detecting optics 9 will be described. For the detection of a magneto-optic signal, differential signal detection optics using a half-wavelength plate 901 and a polarizing beam splitter 903 is shown in the embodiment. For the detection of a focusing error signal, on the other hand, used is a before-behind differential system in which optical detectors 904 and 905 are disposed at positions which are equal distances before and behind the focal point of a lens 902 so as to obtain a focusing error signal from the change of the size of a light spot on the optical detectors. This focusing error signal detection system has been proposed in U.S. Pat. No. 4,742,218. For the detection of a tracking error signal, used is a so-called diffraction light differential system. FIG. 5 shows the shapes of light receiving surfaces of the respective optical detectors 904 and 905 and the processing of the obtained detection signals. In FIG. 5, the symbols $a_1, a_2, b_1, \ldots, f_1$ and $f_2$ represent the light receiving surfaces and signals obtained from the light receiving surfaces.

In this embodiment, as has been described above, magneto-optic signal detection, address reading, focusing error signal detection, and tracking error signal detection can be performed by the same signal detection optics. The signal detection optics is not limited to that described above, but various kinds of optics may be considered.

Figure 6:
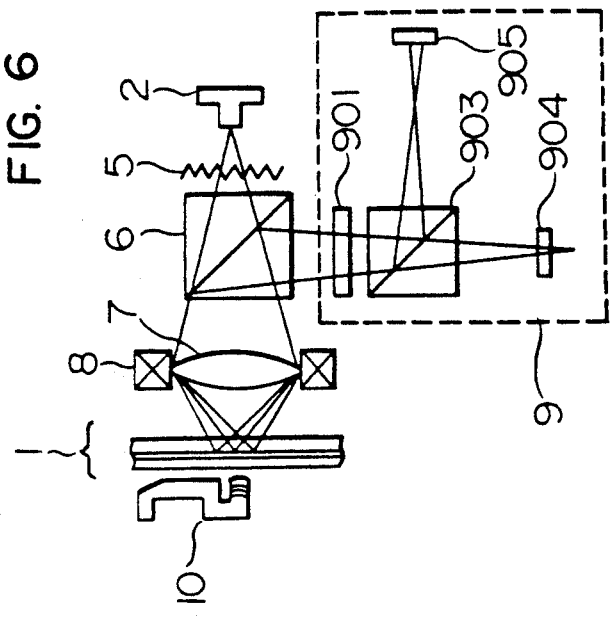
FIG. 6 is a diagram illustrating another embodiment of the present invention.

FIG. 6 shows a second embodiment of the present invention, which has an arrangement in which the collimating lens 3 and the convex lens 902 in the embodiment of FIG. 1 are omitted. In this case, the shapes of the respective detectors 904 and 905 are the same as those in the embodiment of FIG. 1, as shown in FIG. 5. By use of this arrangement, it is possible to make an apparatus smaller in size.

What is claimed is:

1. A magneto-optic recording apparatus comprising:
an optical head for radiating laser light to a magneto-optic recording film on a recording carrier, said optical head including a single laser light source, a diffraction grating for separating the light from said laser light source into at least first and second beams, a focusing optical system for converging said first and second beams on a same track of said magneto-optic recording film, and an optical signal detector system for receiving light reflected from aid magneto-optic recording film to thereby obtain detection signals by means of said first and second beams;
a magnetic head for applying a magnetic filed in accordance with recording information onto said magneto-optic recording film;

a laser drive circuit for changing the intensity of said light from said laser light source between a writing mode and a reading mode;

a detecting circuit for obtaining a magnetization signal recorded on said recorded film by being connected to a selected one of said detection signals obtained in said optical signal detection system by means of said first and second beams respectively, said detection signals being switched between the writing mode and the reading mode; and control means for enabling switching between the writing mode and the reading mode.

2. A magneto-optic recording apparatus according to claim 1, in which said first beam and said second beam are radiated onto said track so that said first beam is located behind said second beam, and in which, in the writing mode, said second and first beams are used as a magneto-optic writing spot and a reading spot for confirmation of writing of information onto said magneto-optic recording film, respectively.

3. A magneto-optic recording apparatus according to claim 2, in which a third beam is separated in addition to said first and second beams by said diffraction grating, and in which said third beam is radiated onto said track so as to be located in front of said second beam, and is used as a reading spot for reading pits in the writing mode.

4. A magneto-optic recording apparatus according to claim 3, further comprising an address information detecting circuit to which a detection signal obtained by means of said third beam is connected in the writing mode.

5. A magneto-optic recording apparatus according to claim 1, in which said detecting circuit includes a magneto-optic signal detecting circuit, and a switching circuit for switching said detection signals obtained by means of said first and second beams between the writing mode and the reading mode so as to obtain said selected one of said detection signals to be connected to said magneto-optic signal detecting circuit.

6. A magneto-optic recording apparatus according to claim 1, further comprising a focusing error signal detecting circuit and a tracking error signal detecting circuit to each of which the detection signal obtained by means of said second beam is connected.

7. A magneto-optic recording apparatus according to claim 1, in which said optical signal detection system is constituted by at least a half-wavelength plate, a polarizing beam splitter, and two optical detectors, one of said two optical detectors being disposed in front of a convergent point of one of two beams separated by said polarizing beam splitter, and the other of said two optical detectors being disposed behind a convergent point of the other of said two beams separated by said polarizing beam splitter.

8. A magneto-optic recording apparatus according to claim 7, in which each of said optical detectors includes at least first and second light receiving portions for respectively receiving said at least first and second beams reflected from said magneto-optic recording film, said second light receiving portion being constituted by four light receiving areas including twofold-divided light receiving areas disposed at a center thereof and one light receiving area disposed at each of the opposite sides of said twofold-divided light receiving areas.

9. A magneto-optic recording apparatus comprising:

an optical head for radiating laser light to a magneto-optic recording film on a recording carrier, said optical head including a single laser light source, a diffraction grating for separating the light from said laser light source into at least first and second beams, a focusing optical system for converting said first and second beams on a same track of said magneto-optic recording film, and an optical signal detection system for receiving light reflected from said magneto-optic recording film to thereby obtain detection signals by means of said first and second beams;

a magnetic head for applying a magnetic field in accordance with recording information onto said magneto-optic recording film;

a laser drive circuit for changing the intensity of light from said laser light source between a writing mode and a reading mode;

a detecting circuit for obtaining a magnetization signal recorded on said recorded film by using, in the writing mode, a detection signal obtained in said optical signal detection system by means of said first beam, while by using, in the reading mode, a detection signal obtained in said optical signal detection system by means of said second beam; and control means for enabling switching between the writing mode and the reading mode.

10. A magneto-optic recording apparatus according to claim 9, in which said first beam and said second beam are radiated onto said track so that said first beam is located behind said second beam, and in which, in the writing mode, said second and first beams are used as a magneto-optic writing spot and a reading spot for confirmation of writing of information onto said magneto-optical recording film, respectively.

11. A magneto-optic recording apparatus according to claim 10, in which a third beam is separated in addition to said first and second beams by said diffraction grating, and in which said third beam is radiated onto said track so as to be located in front of said second beam, and is used as a reading spot for reading pits in the writing mode.

12. A magneto-optic recording apparatus according to claim 11, further comprising an address information detecting circuit to which a detection signal obtained by means of said third beam is connected in the writing mode.

13. A magneto-optic recording apparatus according to claim 9, in which said detecting circuit includes a magneto-optic signal detecting circuit, and a switching circuit for switching said detection signals obtained by means of said first and second beams between writing mode and the reading mode so as to obtain said selected one of said detection signals to be connected to said magneto-optic signal detecting circuit.

14. A magneto-optic recording apparatus according to claim 13, further comprising a focusing error signal detecting circuit and a tracking error signal detecting circuit to each of which the detection signal obtained by means of said second beam is connected.

15. An overwritable magneto-optic disk apparatus, in which in the case where a magnetic field which is varied in accordance with recording information is applied to a magneto-optic recording film on a disk by a magnetic field applying means and high output laser light is radiated continuously from an optical head so as to perform recording of information, light radiated from a single laser light source in said optical head is divided into at least two beams by a diffraction grating, said at least two beams being converged respectively as a writing and erasing spot and a reading spot onto a same recording track on said disk.

16. An overwritable magneto-optic disk apparatus according to claim 15, in which said reading spot is disposed behind said writing and erasing spot so as to perform an error check immediately after writing of information on said magneto-optic recording film.

17. An overwritable magneto-optic disk apparatus according to claim 15, in which reading of a magneto-optic signal is performed by said writing and erasing spot in a reading mode, while, in a writing mode, reading of a magneto-optic signal is performed by said reading spot, and further comprising control means for enabling switching between said reading mode and said writing mode.

18. An overwritable magneto-optic disk apparatus according to claim 15, wherein said magnetic field applying means applies a magnetic field which is polarity-inverted in accordance with the recording information.

19. An overwritable magneto-optic disk apparatus according to claim 15, wherein said magnetic field applying means applies a magnetic field which is intensity-modulated in accordance with the recording information.

* * * * *